United States Patent
Joachimi et al.

(10) Patent No.: US 7,166,669 B2
(45) Date of Patent: Jan. 23, 2007

(54) LASER BEAM WELDABLE THERMOPLASTIC MOLDING MATERIALS

(75) Inventors: Detlev Joachimi, Krefeld (DE); Andreas Elschner, Mühlheim (DE); Manfred Botzen, Krefeld (DE); Frank Krause, Bergisch Gladbach (DE); Herbert Magerstedt, Moers (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 10/149,861

(22) PCT Filed: Dec. 4, 2000

(86) PCT No.: PCT/EP00/12159

§ 371 (c)(1),
(2), (4) Date: Jan. 13, 2003

(87) PCT Pub. No.: WO01/44357

PCT Pub. Date: Jun. 21, 2001

(65) Prior Publication Data

US 2003/0125429 A1    Jul. 3, 2003

(30) Foreign Application Priority Data

Dec. 14, 1999  (DE)  ................. 199 60 104

(51) Int. Cl.
| C08L 67/00 | (2006.01) |
| C08L 77/00 | (2006.01) |
| H05B 6/00  | (2006.01) |
| B29C 65/16 | (2006.01) |

(52) U.S. Cl. .................. 524/601; 524/606; 156/272.8; 264/482

(58) Field of Classification Search ............... 524/601, 524/606, 494; 156/272.8; 264/482
See application file for complete search history.

(56) References Cited

U.S. PATENT DOCUMENTS

| 5,004,406 A | 4/1991 | Kuroyanagi et al. ........ 417/273 |
| 5,605,945 A | 2/1997 | Sayed et al. ................ 523/440 |
| 5,893,959 A | 4/1999 | Muellich ................. 156/272.8 |
| 6,277,474 B1 * | 8/2001 | Murschall et al. ........ 428/195.1 |
| 6,759,458 B1 * | 7/2004 | Reil ............................ 524/89 |
| 2002/0002225 A1 | 1/2002 | Reil ............................ 524/358 |
| 2002/0056707 A1 * | 5/2002 | Pinho et al. ............ 219/121.64 |
| 2002/0156161 A1 * | 10/2002 | Koshida et al. ............... 524/190 |
| 2003/0039837 A1 * | 2/2003 | Koshida et al. ............ 428/411.1 |
| 2003/0124351 A1 * | 7/2003 | Sakamoto et al. ........... 428/401 |
| 2003/0125429 A1 | 7/2003 | Joachimi et al. ............. 524/105 |

FOREIGN PATENT DOCUMENTS

WO        95/26869        10/1995

OTHER PUBLICATIONS

STN [online][retrieved on Dec. 4, 2005] Retrieved from the Internet: <URL: http://www.stn.cas.org/>.*
Plastverarbeiter, vol. 46, No. 9, (month unavailable) 1995, pp. 42-46, H. Potente, M. Heil and J. Korte, "Laserschweissen von Thermoplasten".
Plastverarbeiter, vol. 50, No. 4, (month unavailable) 1999, pp. 18-19, "Berührungslos, schnell und sauber".
*Haensch D. et al: "Harte und Weiche Kunststoffe mit Diodenlaser Verbinden. Joining Hard and Soft Plastics with a Diode Laser" Kunststoffe, DE, Carl Hanser Verlag. Munchen, Bd. 88, Nr. 2, Feb. 1, 1998, Seiten 210-212, XP000732887 ISSN: 0023-5563 in der Anmeldung erwähnt Seite 210, rechte Spalte; Abbildung 2.
*Becker D. et al: "Trends Bei Serien-Schweissverfahren" Kunststoffe, DE, Carl Hanser Verlag, Munchen, Bd. 87, Nr. 11, Nov. 1, 1997, Seiten 1632-1634, 1636, XP000721896 ISSN: 0023-5563 in der Anmeldung erwähnt Seite 1638, rechte Spaite -Seite 1640.
*Potente H. et al: "Laser-Durchstrahlsxhweissen Von PE-HD" Kunststoffe, DE Carl Hanser Verlag. Munchen, Bd. 87, Nr. 3 Mar. 1, 1997, Seiten 348-350, XP000703688 ISSN: 0023-5563 in der Anmeldung er Wähnt Seite 348, rechte Spalte.
Product description for Grilamid TR 55, "Housing for electronic Car Key".
Ullmann's Encyclopedia of Industrial Chemistry, 1998, 2.1 Basic Principles of Color, pp. 1-3.
Ullmann's Encyclopedia of Industrial Chemistry, 1998, 10.2.1.2. Fluorans, pp. 1-4.

* cited by examiner

Primary Examiner—Callie Shosho
(74) Attorney, Agent, or Firm—Nicanor A. Köhncke

(57) ABSTRACT

Dark-colored thermoplastic molding compositions are disclosed. The compositions are suitable for making molded parts which in the wavelength region from 700 to 1200 nm are laser-transmitting, at least in spectral partial regions, and may be welded to laser-absorbing molded parts by means of laser transmissions welding.

9 Claims, 2 Drawing Sheets

LASER BEAM WELDABLE THERMOPLASTIC MOLDING MATERIALS

The present invention relates to dark-coloured thermoplastic moulding compositions and moulded parts produced therefrom, which in the wavelength region from 700 to 1200 nm are laser-transmitting, at least in spectral partial regions, and can be welded to laser-absorbing moulded parts by means of laser transmission welding.

Various processes exist for the welding of plastics moulded parts (Kunststoffe 87, (1997), 11, 1632–1640). In the case of the widely used heated element welding and vibration welding processes (for example for automotive manifolds) a precondition for a stable weld is adequate softening of the components of the bond in the contact zone before the actual joining step.

When the components of the weld are pressed together it is crucial for the strength of the weld which is to be formed that the pressure applied for this purpose lies within a specific optimal range. It should be neither excessive, which would result in excessive ejection of melt from the contact zone, nor, however, insufficient, which would likewise result in weaknesses in the weld. One of a number of reasons for this is the impossibility of achieving 100% fitting accuracy between many of the technical components which require to be welded together. Although contact between the halves of the moulded part can be achieved over the entire weld by the application of sufficiently high contact pressure, the locally varying pressure conditions lead to the ejection of greater or lesser amounts of melt from the weld, and hence to local fluctuations in the strength. It is possible to lessen the problem by, for example, increasing the melt viscosity (EP-A 0 685 528 A1), which results in less ejection of melt from the joining zone.

As an alternative method to vibration welding and heated element welding, laser transmission welding, in particular by diode laser, has become increasingly widespread in recent times. Absorption of radiation by the moulding composition forms the basis of laser transmission welding of plastics. Pure polymers are largely transparent or translucent to laser radiation, that is to say, they are poor absorbers.

Absorption, and hence the conversion of laser light into heat, can be controlled by means of pigments, fillers and reinforcements, and additives.

Basic principles of laser transmission welding are described in the specialist literature (Kunststoffe 87 (1997) 3, 348–350; Kunststoffe 88 (1998) 2, 210–212; Kunststoffe 87 (1997) 11, 1632–1640; Plastverarbeiter 50 (1999) 4, 18–19; Plastverarbeiter 46 (1995) 9, 42–46).

A precondition for the application of laser beam welding is that the radiation emitted by the laser first penetrates at least one component of the join, which is sufficiently transparent to laser light of the wavelength utilised, and is then absorbed by the second component of the join in a thin layer a few 100 µm thick and is converted into heat, which leads to melting in the contact zone and finally to bonding of the two components of the join by means of a weld.

Partially crystalline thermoplastics such as polyamides, for example polyamide 6 (PA 6) and polyamide 66 (PA 66), or polyesters, for example polybutylene terephthalate (PBT) and polyethylene terephthalate (PET), are largely transparent or laser-translucent in the wavelength region of the lasers normally utilised for welding thermoplastics (Nd:YAG lasers: 1060 nm; high-performance diode lasers: 800 to 1000 nm).

Whenever the terms "laser-transparent" and "laser-absorbing" are used hereinbelow, they refer at all times to the wavelength region indicated above. However, the partially crystalline morphology results in varying degrees of scattering of the laser light, such that the diffuse portion accounts for a large proportion of the transmission. The transmission capacity for IR laser light is conventionally measured by a spectrophotometer and an integrating photometer sphere. This measuring arrangement also detects the diffuse portion of the transmitted radiation. Measurement takes place not only at a wavelength but in a spectral region which includes all the laser wavelengths currently utilised for the welding procedure.

The transmission of laser light is degraded by constituents of the thermoplastic moulding compositions, which absorb light of the corresponding wavelength. These are in particular carbon blacks, but also other dyes, pigments or fillers and reinforcements, for example carbon fibres. Successful industrial application of laser transmission welding for the bonding of moulded parts prepared from thermoplastic moulding compositions therefore requires a laser beam-absorbing moulding composition and a moulding composition which is largely laser beam-transparent.

Moulding compositions which comprise carbon black may be utilised for the laser-absorbing moulding composition, for example in the case of glass fibre-reinforced PA 6 compounds. Such moulding compositions are, for example, normally also utilised for manifolds of automotive internal combustion engines, which are joined by the vibration welding process.

If radiation is absorbed very close to the surface, which may under certain circumstances result in lower weld strength, an improvement can be achieved optionally by reducing the carbon black concentration (Kunststoffe 87 (1997) 3, 348–350).

EP-A 0 751 865 describes a laser transmission welding process in which a first work piece part having a transmission greater than 60% is welded to a second work piece part having negligible transmission. Here, the low transmission of the housing base is obtained by pigmentation with from 1% to 2% dyes and for the housing cover with a lower colorant concentration, optionally also without pigmentation. No description is provided as to the pigments and colorants which are suitable.

In principle, therefore, the combination of, for example, non-coloured glass fibre-reinforced PA 6 as the laser-transparent component with a glass fibre-reinforced PA 6 coloured by means of carbon black as the laser-absorbing component is a possible route to achieving a solid bonding of two moulded parts produced in this instance from glass fibre-reinforced PA 6.

The bonding of a black (coloured, for example, by means of carbon black, and laser-absorbing) moulded part to a colourless or white (non-coloured, laser-transparent) moulded part is, however, problematic for many applications. In particular in the case of applications in which thermal loading is high (T>100° C.), such as is typical in the case of, for example, polyamide moulded parts in the automotive sector, non-coloured moulded parts very rapidly undergo unattractive yellowish to brownish colouring of the surface, which is undesirable for aesthetic reasons.

The colorant most frequently used to colour technical thermoplastics black is carbon black, with carbon blacks being utilised which have been manufactured by a variety of processes and have differing particle size distributions and/or specific surface areas. The use of carbon blacks is markedly more cost-effective for black coloration than organic or inorganic colorants.

In many cases, however, coloration with carbon blacks or inorganic pigments has a negative influence on mechanical properties of technical thermoplastics, in particular the toughness measured, for example, as Izod impact strength in accordance with ISO 180 1C.

In some technical thermoplastics, for example polyamide 6 and polyamide 66, carbon blacks act additionally as nucleating agents, that is to say, the carbon black acts as a seed crystal in the polyamide melt and consequently promotes crystallisation. Accelerated crystallisation, however, frequently leads to impairment of the surface quality, in particular in the case of moulded parts manufactured by the injection moulding process. For this reason the lowest possible concentration of carbon black is frequently utilised in thermoplastic moulding compositions. Glass fibre-reinforced polyamide 6 moulding compositions, however, still have such a low transmission for laser light, even at very low carbon black contents (<0.2%), that welding of moulded parts in accordance with the process described in EP-A 0 751 865 is not possible. While even greater reduction of the carbon black concentration results in increased transmission, this is very much at the expense of a uniform colour perception for the work piece as a whole.

The most uniform possible colouring of the components of the join which are to be welded is desirable, coupled with the best possible surface quality. Good surface quality here means above all the smoothest possible surface with a high gloss.

The object is therefore to find dark, laser-transmitting moulding compositions for the production of moulded parts of high surface quality, which can be bonded effectively to laser-absorbing moulded parts by the laser transmission process, wherein in a preferred embodiment the two moulded parts exhibit to the human eye a very similar optical appearance in terms of colour and surface quality.

It has now surprisingly been found that by combining a plurality of non-black colorants in a thermoplastic moulding composition moulded parts having a black colour perception (comparable with coloration with carbon black) and very high surface quality, can be produced whose laser transparency lies within the range of that of non-coloured material, and which can therefore be welded effectively with a laser-absorbing component of the join.

The combination of the colorants for the black-coloured moulded body which is penetrated by the laser should be selected such that the transmission in the VIS spectral region (light wavelength region from 400 nm to 700 nm), at least in spectral partial regions, is <10% and in the NIR region (light wavelength region from 700 nm to 1200 nm) >10%. The transmission in the NIR should preferably be >20% and the transmission in the VIS <5%, particularly preferably <1% (VIS) and >30% (NIR).

The colorants should be combined such that when used in a non-scattering matrix the extinction at 1 mm layer thickness in the VIS region is $E \geq 2$ and in the NIR region $E \leq 2$. The extinction at 1 mm layer thickness in the VIS region is preferably $E > 2.5$ at $E < 1$ in the NIR region, and particularly preferably $E > 3$ in the VIS region at $E < 0.1$ in the NIR region.

The present invention therefore provides thermoplastic moulding compositions which are coloured with a combination of at least two colorants, such that a dark colour perception (standard colour value Y<30, preferably Y<20, particularly preferably Y<10) of the moulding composition results and that in the visible light region (400 nm to 700 nm) at a layer thickness which can be at least within the range 0.4 to 5 mm, low or nil transmission ($\leq 10\%$) occurs, and in the wavelength region from 700 nm to 1200 =m, at least in spectral partial regions, transmission of >10% occurs upon irradiation with LASER light.

Moulding compositions are preferred which in the visible light region (400 nm to 700 nm) at a layer thickness which can be at least within the range 0.4 to 5 mm have low or nil transmission ($\leq 5\%$) and in the wavelength region from 700 nm to 1200 nm, at least in spectral partial regions, transmission of >20%, and the moulding composition affords a dark colour perception (standard colour value Y<30, preferably Y<20, particularly preferably Y<10).

Moulding compositions are particularly preferred which in the visible light region (400 nm to 700 nm) at a layer thickness which may be at least within the range 0.4 to 5 mm have low or nil transmission ($\leq 1\%$) and in the wavelength region from 700 nm to 1200 nm, at least in spectral partial regions, transmission of >30%, and afford a dark colour perception (standard colour value Y<30, preferably Y<20, particularly preferably Y<10).

The achievement of this object is applicable to all laser-transparent plastics, in particular polyamides and thermoplastic polyesters.

Polymers or copolymers, for example based on polyalkylene terephthalates, aromatic polyesters, polyamide, polycarbonate, polyacrylate, polymethacrylate, ABS graft polymers, polyolefins such as polyethylene or polypropylene, polystyrene, polyvinyl chloride, polyoxymethylene, polyimide, polyethers and polyether ketones, which may be utilised singly or as a blend of different polymers, are suitable as the polymer matrix.

The polyamides according to the invention may be prepared by various processes and synthesised from very different building blocks and for special applications may, alone or in combination with processing aids, stabilisers, polymeric alloying components (for example elastomers) or also reinforcement materials (such as, for example, mineral fillers or glass fibres), be equipped to afford materials having specifically adjusted property combinations. Blends comprising portions of other polymers, for example of polyethylene, polypropylene, ABS, are also suitable. The properties of the polyamides can be improved by the addition of elastomers, for example with regard to the impact strength of, for example, reinforced polyamides. The many permutations make possible a very great number of products having the most varied properties.

A multiplicity of methods have become known for the preparation of polyamides, with different monomer building blocks, various chain regulators to adjust a required molecular weight or also monomers having reactive groups for subsequently planned post-treatments being utilised, depending on the desired end product.

Without exception the industrially relevant processes for the preparation of polyamides take place by way of polycondensation in the melt. In this context hydrolytic polymerisation of lactams is also understood to be a polycondensation reaction.

Preferred polyamides are partially crystalline polyamides which may be prepared starting from diamines and dicarboxylic acids and/or lactams having at least 5 members in the ring or corresponding amino acids.

Aliphatic and/or aromatic dicarboxylic acids such as adipic acid, 2,2,4- and 2,4,4-trimethyladipic acid, azelaic acid, sebacic acid, isophthalic acid, terephthalic acid, aliphatic and/or aromatic diamines such as, for example, hexamethylene diamine, 1,9-nonane diamine, 2,2,4- and 2,4,4-trimethylhexamethylene diamine, the isomeric diaminodicyclohexyl methanes, diaminodicyclohexyl propanes, bis-aminomethyl cyclohexane, phenylene diamines, xylylene diamines, aminocarboxylic acids such as, for example, aminohexanoic acid, or the corresponding lactams, are considered as starting products. Copolyamides prepared from a plurality of the named monomers are included.

Caprolactams are particularly preferably utilised, most particularly preferably ε-caprolactam.

The majority of compounds based on PA 6, PA 66 and other aliphatic and/or aromatic polyamides or copolyamides are furthermore particularly suitable, in which there are from 3 to 11 methylene groups to one polyamide group in the polymer chain.

The polyamides prepared according to the invention may also be utilised in mixture with other polyamides and/or further polymers.

The polyamide moulding compositions may additionally also comprise fire retardants such as, for example, phosphorus compounds, organic halo compounds, nitrogen compounds and/or magnesium hydroxide, stabilisers, processing aids such as, for example, lubricants, nucleating agents, stabilisers, impact modifiers such as, for example, rubbers or polyolefins, or the like, provided that these do not have excessive absorption in the region of the wavelength of the laser employed.

Aramide fibres, mineral fibres and whiskers, in addition to glass fibres, are considered as fibrous reinforcements. Calcium carbonate, dolomite, calcium sulfate, mica, fluor mica, wollastonite, talcum and kaolin might be named as examples of suitable mineral fillers. The fibrous reinforcements and the mineral fillers may be surface-treated in order to improve the mechanical properties.

The addition of the fillers may take place before, during or after the polymerisation of the monomers to form the polyamide. If addition of the fillers according to the invention takes place after the polymerisation, it preferably takes place by addition to the polyamide melt in an extruder. If addition of the fillers according to the invention takes place before or during the polymerisation, the polymerisation can include phases in which working is in the presence of from 1 to 50 wt. % water.

As the addition is taking place the fillers may already be present as particles of the particle size which ultimately occurs in the moulding composition. Alternatively, the fillers may be added in the form of precursors from which the particles which ultimately occur in the moulding composition arise only during the course of the addition or incorporation.

Red phosphorus (DE-A-3 713 746 A1 (=U.S. Pat. No. 4,877,823) and EP-A-299 444 (=U.S. Pat. No. 5,081,222), brominated diphenyls or diphenyl ethers in combination with antimony trioxide, and chlorinated cycloaliphatic hydrocarbons (Dechlorane® plus from Occidental Chemical Co.), brominated styrene oligomers (for example in DE-A-2 703 419) and polystyrenes brominated in the ring (for example Pyro-Chek 68® from FERRO Chemicals) are, for example, considered as fire or flame retardants.

Zinc compounds or iron oxides are, for example, utilised as a synergist for the named halo compounds As a further alternative, melamine salts have proved to be of value, above all as flame retardants, particularly for non-reinforced polyamides.

Furthermore, magnesium hydroxide has long proved to be of value as a flame retardant for polyamide.

The polyamide moulding compositions may contain in addition to glass fibres additionally rubber-elastic polymers (frequently also designated as an impact modifier, elastomer or rubber).

The partially aromatic polyesters according to the invention are selected from the group consisting of derivatives of polyalkylidene terephthalates, preferably selected from the group consisting of the polyethylene terephthalates, the polytrimethylene terephthalates and the polybutylene terephthalates, particularly preferably the polybutylene terephthalates, most particularly preferably of polybutylene terephthalate.

Partially aromatic polyester is understood to mean materials which in addition to aromatic molecular entities also comprise aliphatic molecular entities.

Polyalkykene terephthalates within the meaning of the invention are reaction products of aromatic dicarboxylic acids or reactive derivatives thereof (for example dimethyl esters or anhydrides) and aliphatic, cycloaliphatic or araliphatic diols and mixtures of these reaction products.

Preferred polyalkylene terephthalates may be prepared by known methods from terephthalic acid (or reactive derivatives thereof) and aliphatic or cycloaliphatic diols having 2 to 10 C atoms (Kunststoff-Handbuch [Manual of Plastics], Vol. VIII, p. 695 et seq., Karl-Hanser-Verlag, Munich 1973).

Preferred polyalkylene terephthalates comprise at least 80 mol. %, preferably 90 mol. %, in relation to the dicarboxylic acid, of terephthalic acid groups and at least 80 mol. %, preferably at least 90 mol. %, in relation to the diol component, of ethylene glycol groups and/or 1,3-propanediol groups and/or 1,4-butanediol groups.

The preferred polyalkylene terephthalates may comprise in addition to terephthalic acid groups up to 20 mol. % groups of other aromatic dicarboxylic acids having 8 to 14 C atoms or of aliphatic dicarboxylic acids having 4 to 12 C atoms, such as phthalic acid, isophthalic acid, naphthalene-2,6-dicarboxylic acid, 4,4'-diphenyldicarboxylic acid, succinic, adipic, sebacic, azelaic, cyclohexane diacetic acid groups.

In addition to ethylene glycol groups or 1,3-propanediol glycol groups or 1,4-butanediol glycol groups, the preferred polyalkylene terephthalates may comprise up to 20 mol. % of other aliphatic diols having 3 to 12 C atoms or of cycloaliphatic diols having 6 to 21 C atoms, for example 1,3-propanediol, 2-ethylpropanediol-1,3, neopentyl glycol, 1,5-pentanediol, 1,6-hexanediol, 1,4-cyclohexanedimethanol, 3-methylpentanediol-2,4, 2-methylpentanediol-2,4, 2,2,4-trimethylpentanediol-1,3 and -1,6, 2-ethylhexanediol-1,3, 2,2-diethylpropanediol-1,3, 2,5-hexanediol, 1,4-di-(β-hydroxyethoxy)benzene, 2,2-bis(4-hydroxycyclohexyl)propane, 2,4-dihydroxy-1,1,3,3-tetramethylcyclobutane, 2,2-bis(3-β-hydroxyethoxyphenyl)propane and 2,2-bis(4-hydroxypropoxyphenyl)propane (DE-OS 24 07 674, 24 07 776, 27 15 932) groups.

The polyalkylene terephthalates may be branched by the incorporation of relatively small quantities of trihydric or tetrahydric alcohols or tribasic or tetrabasic carboxylic acids, such as are described, for example, in DE-A 19 00 270 and U.S. Pat. No. 3,692,744. Examples of preferred branching agents are trimesic acid, trimellitic acid, trimethylolethane and trimethylolpropane and pentaerythritol.

The use of not more than 1 mol. % of the branching agent, in relation to the acid component, is preferred.

Polyalkylene terephthalates which are prepared solely from terephthalic acid and reactive derivatives thereof (for example dialkyl esters thereof) and ethylene glycol and/or 1,3-propanediol and/or 1,4-butanediol (polyethylene terephthalate and polybutylene terephthalate), and mixtures of these polyalkylene terephthalates are particularly preferred.

Preferred polyalkylene terephthalates are also copolyesters which are prepared from at least two of the aforementioned acid components and/or from at least two of the aforementioned alcohol components, particularly preferred copolyesters are poly(ethylene glycol/1,4-butanediol) terephthalates.

The polyalkylene terephthalates generally have an intrinsic viscosity of approx. from 0.4 to 1.5, preferably 0.5 to 1.3, in each case measured in phenol/o-dichlorobenzene (1:1 parts by weight) at 25° C.

The partially aromatic polyesters may furthermore comprise additives such as, for example, fillers and reinforcements such as, for example, glass fibres or mineral fillers, flame retardants, processing aids, stabilisers, flow promoters, antistatic agents and other conventional additives.

Glass fibres, glass spheres, glass cloth, glass mats, aramide fibres, potassium titanate fibres, natural fibres, amorphous silica, magnesium carbonate, barium sulfate, feldspar, mica, silicates, quartz, talcum, kaolin, wollastonite, inter alia, which may also be surface-treated, may be added as fibrous or particulate fillers and reinforcements for the moulding compositions according to the invention. Preferred reinforcements are conventional commercial glass fibres. The glass fibres, which generally have a fibre diameter of between 8 and 18 μm, may be added as continuous strands or as chopped strands or ground glass fibres, with the fibres able to be equipped with a suitable sizing system and a coupling agent or coupling agent system, for example based on silane.

Needle-form mineral fillers are also suitable. Needle-form mineral fillers are understood within the meaning of the invention to mean mineral filler having a strongly defined needle-form structure. Needle-form wollastonite might be named as an example. The mineral preferably has an aspect ratio (length/diameter ratio) of from 8:1 to 35:1, preferably from 8:1 to 11:1. The mineral filler may optionally be surface-treated.

The polyester moulding composition preferably comprises as an addition from 0 to 50 parts by weight, preferably from 0 to 40, in particular from 10 to 30 parts by weight, of fillers and/or reinforcements. Polyester moulding compositions having no fillers and/or reinforcements may likewise be used.

Normal commercial organic compounds or halo compounds having synergists, or normal commercial organic nitrogen compounds or organic/inorganic phosphorus compounds are suitable as flame retardants. Mineral flame-retardant additives such as magnesium hydroxide or CaMg carbonate hydrates (for example DE-A 4 236 122) may also be utilised. Ethylene-1,2-bistetrabromophthalimide, epoxidised tetrabromobisphenol A resin, tetrabromobisphenol A oligocarbonate, tetrachlorobisphenol A oligocarbonate, pentabromopolyacrylate, brominated polystyrene might be named by way of example as halogen-containing, in particular brominated and chlorinated, compounds. The phosphorus compounds according to WO 98/17720 are suitable as organic phosphorus compounds, for example triphenyl phosphate (TPP), resorcinol-bis(diphenylphosphate) including oligomers (RDP) as well as bisphenol A-bisdiphenylphosphate including oligomers (BDP), melamine phosphate, melamine pyrophosphate, melamine polyphosphate and mixtures thereof. As nitrogen compounds melamine and melamine cyanurate are in particular considered. Antimony compounds, in particular antimony trioxide and antimony pentoxide, zinc compounds, tin compounds such as, for example, tin stannate and borates are suitable as synergists. Carbon builders and/or tetrafluoroethylene polymers may be added.

The partially aromatic polyesters according to the invention may comprise conventional additives such as heat stabilisers to prevent thermal decomposition and thermal crosslinking, UV stabilisers, plasticisers, lubricants and demoulding agents, nucleating agents, antistatic agents, optionally further stabilisers.

The partially aromatic polyester moulding compositions according to the invention are prepared by mixing the respective constituents in known manner and melt-compounding or melt-extrusion at temperatures of from 200° C. to 330° C. in conventional units such as, for example, internal mixers, extruders, twin screws. Further additives such as, for example, reinforcements, stabilisers, lubricants and demoulding agents, nucleating agents, and other additives may be added in the melt-compounding or melt-extrusion step.

Sterically hindered phenols and/or phosphites, hydroquinones, aromatic secondary amines such as diphenylamines, various substituted representatives of these groups and mixtures thereof at concentrations of up to 1 wt. %, in relation to the weight of the thermoplastic moulding compositions are named as examples of oxidation retardants and heat stabilisers.

Various substituted resorcinols, salicylates, benzotriazoles and benzophenones might be named as UV stabilisers which are generally used in quantities of up to 2 wt. %, in relation to the moulding composition.

Inorganic pigments such as titanium dioxide, ultramarine blue, iron oxide and carbon black, furthermore organic pigments such as phthalocyanines, quinacridones, perylenes as well as dyes, such as nigrosine and anthraquinones may be added as colorants as well as other colorants if these do not absorb in the region of the laser employed. They may otherwise be utilised only in quantities so small that at least a partial transmission of the laser light is still possible.

Sodium phenylphosphinate, aluminium oxide, silicon dioxide as well as preferably talc may, for example, be utilised as nucleating agents.

Lubricants and demoulding agents which are conventionally utilised in quantities of up to 1 wt. % are preferably ester waxes, pentaerithrytol stearate (PETS), long-chain fatty acids (for example stearic acid or behenic acid), salts thereof (for example Ca stearate or Zn stearate) as well as amide derivatives (for example ethylene-bisstearyl amide) or montan waxes as well as low molecular weight polyethylene waxes or polypropylene waxes.

Phthalic acid dioctyl esters, phthalic acid dibenzyl esters, phthalic acid butylbenzyl esters, hydrocarbon oils, N-(n-butyl)benzenesulfonamide might be named as examples of plasticisers.

The additional utilisation of rubber-elastic polymers (frequently also designated as an impact modifier, elastomer or rubber) is particularly preferred.

Quite generally, these are copolymers which are constructed preferably from at least two of the following monomers: ethylene, propylene, butadiene, isobutene, isoprene, chloroprene, vinyl acetate, styrene, acrylonitrile and acrylic or methacrylic acid esters having 1 to 18 C atoms in the alcohol component.

Such polymers are described, for example, in Houben-Weyl, Methoden der organischen Chemie [Organic Chemistry Methods], Vol. 14/1 (Georg-Thieme-Verlag), Stuttgart, 1961), pp. 392 to 406, and in C. B. Bucknall's monograph, "Toughened Plastics" (Applied Science Publishers, London, 1977).

Mixtures of rubber types may furthermore also be utilised.

Both organic and inorganic pigments and/or dyes are suitable as colorants. Carbon black optionally in very small quantities (preferably <0.2 wt. %) is a constituent of the pigment mixture. The pigments/dyes and/or carbon blacks may optionally also be utilised as a batch.

Examples of inorganic pigments are antimony trioxide, antimony pentoxide, basic lead carbonate, basic lead sulfate or lead silicate, lithopones, titanium dioxide (anatase, rutile), zinc oxide, zinc sulfide, metal oxides such as Berlin blue, lead chromate, lead sulfochromates, chrome antimony titanate, chromium oxides, iron oxides, cobalt blue, cobalt chromium blue, cobalt nickel grey, manganese blue, manganese violet, molybdate orange, molybdate red, nickel antimony titanate, ultramarine blue, as well as metal sulfides such as antimony trisulfide, cadmium sulfide, cadmium sulfoselenides, zirconium silicates, zirconium vanadium blue, zirconium praseodymium yellow.

Examples of organic pigments are anthraquinone, azo, azomethine, benzanthrone, quinacridone, quinophthalone, dioxazine, flavanthrone, indanthrone, isoindoline, isoindolinone, methine, perinone, perylene, phthalocyanine, pyranthrone, pyrrolopyrrole, thioindigo pigments as well as metal complexes of, for example, azo, azomethine, methine dyes or metal salts of azo compounds.

Dispersion dyes such as those of the anthraquinone series, for example alkylamino, amino, arylamino, cyclohexylamino, hydroxy, hydroxyamino or phenylmercapto anthraquinone, as well as metal complexes of azo dyes, in particular 1:2 chromium or cobalt complexes of monoazo dyes, as well as fluorescent dyes, for example those from the benzothiazole, coumarin, oxazine or thiazine series, for example, are suitable as polymer-soluble dyes.

The polymer-soluble dyes may also be utilised in combinations with fillers and/or pigments, in particular with inorganic pigments such as titanium dioxide.

According to the invention, pigments and/or polymer-soluble dyes may be used. The dyes or pigments used may have nil or only very low absorption in the NIR spectral region and should be compatible with the thermoplastic polymers used according to the invention.

Suitable pigment additives are, for example, fatty acids having at least 12 C atoms, such as behenic acid or stearic acid, amides, salts or esters thereof, such as aluminium stearate, magnesium stearate, zinc stearate or magnesium behenate, as well as quaternary ammonium compounds such as tri-($C_1$–$C_4$)-alkylbenzylammonium salts, waxes such as polyethylene wax, colophonic acids such as abietic acid, resin soap, hydrogenated or dimerised colophony, $C_{12}$–$C_{18}$-paraffin disulfonic acids or alkylphenols.

Dyes of the pyrazolone, perinone and anthraquinone type, also of the methine, azo and coumarin type, are preferred according to the invention.

The metal-containing pigments such as the inorganic pigments and the metal complexes of azo, azomethine or methine dyes, azomethine, quinacridone, dioxazine, isoindoline, isoindolinone, perylene, phthalocyanine, pyrrolopyrrole and thioindigo colorants and bismuth vanadate are likewise preferred.

The present application also provides moulded parts produced from the thermoplastic moulding composition according to the invention and the use of the moulding composition according to the invention for the production of moulded parts which are bonded to other moulded parts by laser transmission welding.

The present invention also provides bonded moulded parts which are joined by laser transmission welding and at least one part of which consists of the thermoplastic moulding composition according to the invention.

EXAMPLES

Non-reinforced PA 6 (Durethan B30S, a commercial product from Bayer AG, Leverkusen, Germany, relative viscosity=3.0) or glass fibre-reinforced PA 6 (Durethan BKV30, a commercial product from Bayer AG, Leverkusen, Germany, relative viscosity=3.0) and glass fibre-reinforced PA 66 (Durethan AKV 30, a commercial product from Bayer AG, Leverkusen, Germany, relative viscosity=3.0) were mixed physically with carbon black (comparative tests, use of master batches) or mixtures of organic colorants and were coloured homogeneously by compounding on a twin screw extruder (ZSK 32 from Werner und Pfleiderer) at composition temperatures of from 260 to 300° C. The melt was then spun off through a water bath and granulated. All viscosity measurements were performed in m-cresol (1% solution, T=25° C.).

The granules obtained were processed in an injection moulding machine of the Arburg 320-210-500 type under the conditions which are conventional for moulding compositions (composition temperatures of from 250 to 290° C., mould temperatures of from 70 to 90° C.) to obtain 2 mm-thick and 4 mm-thick colour sample plates (60 mm×40 mm) for laser transmission measurements and welding tests.

Tables 1 to 4 give examples of the composition and properties of moulding compositions according to the invention and of comparison material.

TABLE 1

| | | Composition of moulding compositions | | | | | | | | | |
|---|---|---|---|---|---|---|---|---|---|---|---|
| | | Ex. 1 | Ex. 2 | Compar. 1 | Compar. 2 | Compar. 3 | Compar. 4 | Ex. 3 | Ex. 4 | Compar. 5 | Compar. 6 |
| PA 6[1] | wt. [%] | 97.77 | 99.62 | 99.8 | 99.9 | 69.8 | 69.9 | 69.77 | 69.62 | 100 | 70 |
| Carbon black[2] | wt. [%] | — | — | 0.2 | 0.1 | 0.2 | 0.1 | | | | |
| Glass fibre[3] | wt. [%] | | | | | 30 | 30 | 30 | 30 | | 30 |

TABLE 1-continued

Composition of moulding compositions

| | | Ex. 1 | Ex. 2 | Com-par. 1 | Com-par. 2 | Com-par. 3 | Com-par. 4 | Ex. 3 | Ex. 4 | Com-par. 5 | Com-par. 6 |
|---|---|---|---|---|---|---|---|---|---|---|---|
| Macrolex yellow 3G[4] | wt. [%] | 0.04 | 0.06 | — | | | | 0.04 | 0.06 | | |
| Macrolex red EG[5] | wt. [%] | 0.12 | 0.20 | — | | | | 0.12 | 0.20 | | |
| Macrolex green 5B[6] | wt. [%] | 0.07 | 0.12 | — | | | | 0.07 | 0.12 | | |

[1] PA 6 of viscosity 3.0, commercial product of Bayer AG, Leverkusen, Germany, to which conventional additives may be admixed in normal quantities and at constant concentrations (0.01–0.5%) as nucleating agent (micro-talc), heat stabiliser (CuI/KBr) and demoulding agent (montan ester wax),
[2] absolute quantity of carbon black as wt. %; masterbatch UN2014, 50% concentration, from Cabot, was utilised,
[3] CS 7928; commercial product of Bayer AG, Leverkusen, Germany
[4] commercial product of Bayer AG, pyrazolone dye, Solvent Yellow 93, colour index 48160
[5] commercial product of Bayer AG, perinone dye, Solvent Red 135
[6] commercial product of Bayer AG, anthraquinone dye, Solvent Green 3, colour index 61565

Measuring of Laser Transmissions, and Results

The sample plates prepared from the IR laser-absorbing and the IR laser-transparent material were both measured on a transmission measuring apparatus consisting of a spectrophotometer and a photometer sphere which detects both light which is transmitted directly and also scattered light. For the IR laser-absorbing specimens measured values of <0.1% were obtained in the NIR spectral region between 800 and 1200 nm, whereas the IR laser-transparent material has a transmission level of typically from 20 to 70%.

Since all the specimens were of very strongly scattering material, the total transmission was evaluated as the sum of the direct and diffuse transmission.

At 1000 nm and in the adjacent wavelength region the specimens corresponding to the Comparison Examples have virtually nil transmission but, rather, almost complete absorption, whereas the specimens of Examples 1 to 4 which are coloured according to the invention show continuing high transmission, this being the total transmission (comprising predominantly diffuse portions of radiation). The

TABLE 2

Transmission measurement results*

| Wave length [nm] | Specimen thickness [nm] | Ex. 1 | Ex. 2 | Com-par. 1 | Com-par. 2 | Com-par. 3 | Com-par. 4 | Ex. 3 | Ex. 4 | Com-par. 5 | Com-par. 6 |
|---|---|---|---|---|---|---|---|---|---|---|---|
| 400 | 2 | <0.1 | <0.1 | <0.1 | <0.1 | <0.1 | <0.1 | <0.1 | <0.1 | | |
| 500 | 2 | <0.1 | <0.1 | <0.1 | <0.1 | <0.1 | <0.1 | <0.1 | <0.1 | | |
| 600 | 2 | <0.1 | <0.1 | <0.1 | <0.1 | <0.1 | <0.1 | <0.1 | <0.1 | | |
| 700 | 2 | 1 | <0.1 | <0.1 | <0.1 | <0.1 | <0.1 | 0.5 | <0.1 | 53 | 53 |
| 800 | 2 | 49 | 48 | <0.1 | <0.1 | <0.1 | <0.1 | 48 | 47 | 56 | 57 |
| 900 | 2 | 55 | 55 | <0.1 | <0.1 | <0.1 | <0.1 | 54 | 54 | 58 | 59 |
| 1000 | 2 | 59 | 60 | <0.1 | <0.1 | <0.1 | <0.1 | 58 | 59 | 61 | 62 |
| 1100 | 2 | 62 | 63 | <0.1 | <0.1 | <0.1 | <0.1 | 61 | 62 | 63 | 65 |
| 1200 | 2 | 45 | 45 | <0.1 | <0.1 | <0.1 | <0.1 | 48 | 49 | 45 | 51 |
| 1300 | 2 | 64 | 64 | <0.1 | <0.1 | <0.1 | <0.1 | 64 | 65 | 64 | 67 |
| 1400 | 2 | 53 | 54 | <0.1 | <0.1 | <0.1 | <0.1 | 56 | 57 | 53 | 59 |
| 400 | 4 | <0.1 | <0.1 | <0.1 | <0.1 | <0.1 | <0.1 | <0.1 | <0.1 | | |
| 500 | 4 | <0.1 | <0.1 | <0.1 | <0.1 | <0.1 | <0.1 | <0.1 | <0.1 | | |
| 600 | 4 | <0.1 | <0.1 | <0.1 | <0.1 | <0.1 | <0.1 | <0.1 | <0.1 | | |
| 700 | 4 | <0.1 | <0.1 | <0.1 | <0.1 | <0.1 | <0.1 | <0.1 | <0.1 | 34 | 30 |
| 800 | 4 | 26 | 24 | <0.1 | <0.1 | <0.1 | <0.1 | 22 | 21 | 36 | 32 |
| 900 | 4 | 31 | 30 | <0.1 | <0.1 | <0.1 | <0.1 | 27 | 28 | 36 | 33 |
| 1000 | 4 | 35 | 34 | <0.1 | <0.1 | <0.1 | <0.1 | 30 | 31 | 37 | 35 |
| 1100 | 4 | 37 | 37 | <0.1 | <0.1 | <0.1 | <0.1 | 33 | 34 | 38 | 37 |
| 1200 | 4 | 16 | 16 | <0.1 | <0.1 | <0.1 | <0.1 | 19 | 19 | 16 | 22 |
| 1300 | 4 | 36 | 36 | <0.1 | <0.1 | <0.1 | <0.1 | 36 | 37 | 36 | 40 |
| 1400 | 4 | 24 | 24 | <0.1 | <0.1 | <0.1 | <0.1 | 27 | 28 | 23 | 31 |

*Total transmission [%], measured on PE Lambda900, 0°/diffuse, reference air T = 100%, an attenuator being used for some measurements.

measured values for the transmission of the specimens coloured according to the invention are only slightly below the values measured for non-coloured material in Comparisons 5 and 6.

In addition to the measurement of the PA specimens, the transmission of 1 mm-thick and 4 mm-thick colour sample plates prepared from polycarbonate coloured with colorant combinations according to the invention corresponding to Examples 1 and 2 was determined. Non-coloured polycarbonate served as a reference material. Since no scattering occurs with polycarbonate, an extinction coefficient which is independent of layer thickness can be determined here, which in the case of the two colour versions according to the invention which were investigated is around E>4 for the VIS spectral region (400 nm to 700 nm) and around E<0.002 for the NIR spectral region (700 nm to 1200 nm).

Laser Welding Tests, and Results

Welding tests were conducted with an Nd:YAG laser in order to investigate the suitability of the moulding compositions for laser transmission welding. The laser beam-transparent sample plates were sawn to a width of 20 mm.

Figure 1:
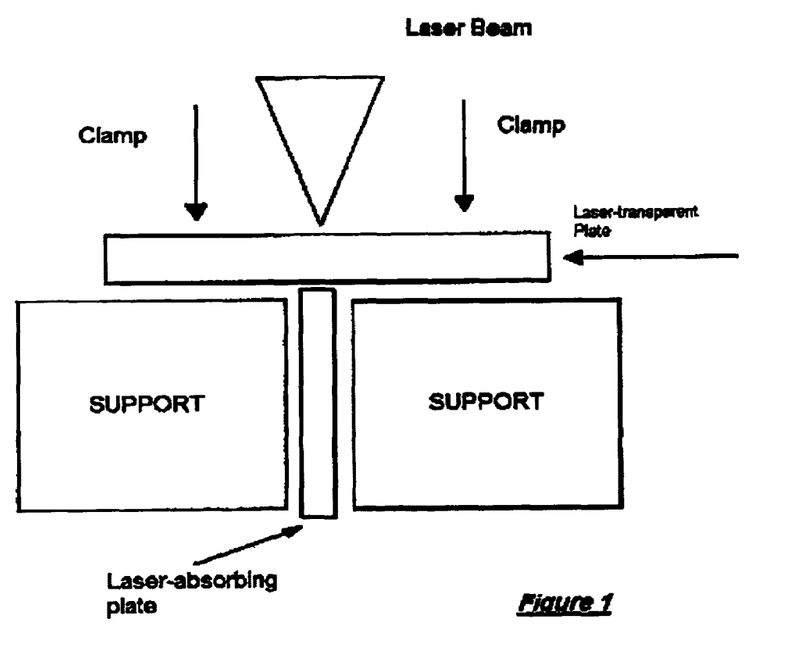
FIG. 1 schematically illustrates, inter alia, a specimen testing device in accord with the Examples, wherein, specimens are depicted as being joined to one another to form a T-joint.

The specimens were clamped into a device and joined to one another in a T-joint, as shown in FIG. 1. The 2 mm specimens were welded at approx. 20 Watt at a speed of 6 mm/s and in 2 scans, and the 4 mm specimens at approx. 35 Watt and in 4 scans.

One scan denotes a sweep over the full width of the specimen with an activated laser beam.

Figure 2:
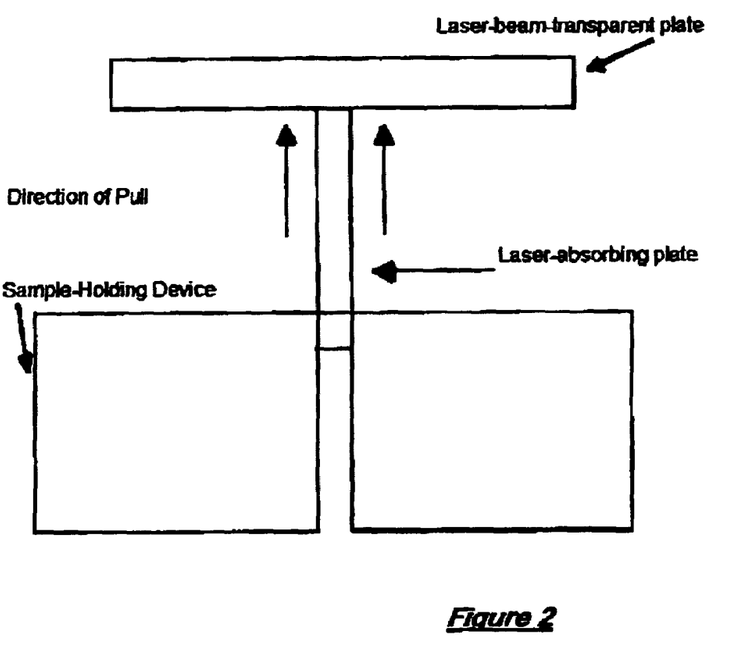
FIG. 2 schematically illustrates, inter alia, a specimen testing device in accord with the Examples for testing the breaking load in a tensile test.

The specimens welded as a T-joint were subjected to breaking load in a tensile test, as shown in FIG. 2.

The force measured here was converted by way of the weld surface area to give a tensile strength. A high level of strength values is obtained.

TABLE 3

Results of tensile testing of laser transmission-welded plates

| Material pairing | | Tensile strength, N/mm² Wall thickness | |
|---|---|---|---|
| Material 1 * | Material 2 | 2 mm | 4 mm |
| Example 3 | Comp. 3 | 46.1 | 75.9 |
| Example 4 | Comp. 3 | 47.3 | 68.4 |
| Example 3 | Comp. 4 | 50.0 | 74.6 |
| Example 4 | Comp. 4 | 39.2 | 63.1 |
| Comp. 4 | Comp. 3 | Welding not possible | Welding not possible |
| Comp. 3 | Comp. 3 | Welding not possible | Welding not possible |

* The moulded part/material which first makes contact with the laser beam is understood here to be Material 1.

The surface quality was evaluated by measurement of the gloss on rectangular plates (155 mm×75 mm×2 mm) injected centrally by way of a sprue gate. In order to obtain better differentiation, the plates were prepared at different injection rates, whereby, as experience suggests, the surface quality, that is to say above all the surface gloss, of non-reinforced PA 6 and of glass fibre-reinforced PA 6 increases as the injection speed increases under processing conditions which are in other respects held constant. It is clear from Table 4 that the surface gloss of plates produced using the polyamide moulding compositions according to the invention at low injection speeds is superior to that of plates produced using moulding compositions coloured with conventional colorants (carbon black).

TABLE 4

Results of gloss measurement in accordance with DIN 67530

| Injection rate [mm/s] | Comp. 3 | Comp. 4 | Example 3 | Example 4 |
|---|---|---|---|---|
| 10 | 1 | 1 | 4 | 6 |
| 20 | 3 | 3 | 26 | 26 |
| 30 | 6 | 8 | 42 | 44 |
| 40 | 12 | 15 | 43 | 52 |
| 50 | 18 | 23 | 43 | 47 |
| 60 | 25 | 29 | 44 | 46 |
| 70 | 30 | 37 | 41 | 48 |

The dark colour perception was evaluated by calorimetric characterisation of the rectangular plates produced at an injection rate of 50 mm/s, with an Ultra Scan XL spectrophotometer from Hunter. The reflection measurements were performed under polychromatic specimen illumination at a measuring geometry of 0°/8° with gloss for standard light type D65/10° in accordance with DIN 5033. Colours having standard colour values of Y<30, preferably <20, particularly preferably <10, were noted as dark.

TABLE 5

Results of colorimetric characterisation

| | Comp. 3 | Comp. 4 | Example 3 | Example 4 |
|---|---|---|---|---|
| Standard colour value Y | 4.89 | 4.91 | 4.59 | 4.57 |

The invention claimed is:

1. Thermoplastic molding compositions which are coloured with combinations of at least two non-black colorants, such that a dark colour perception wherein the standard color value Y<30 of the molding composition results and that in the visible light region at a layer thickness which is at least within the range 0.4 to 5 mm low or nil transmission of <10% occurs and in the wavelength region from 700 nm to 1200 nm, at least in spectral partial regions, transmission of >10% occurs upon irradiation with LASER light.

2. Thermoplastic molding compositions according to claim 1, which exhibits in the visible light region at a layer thickness which is at least within the range 0.4 to 5 mm low or nil transmission of <5% and in the wavelength region from 700 nm to 1200 nm, at least in spectral partial regions, transmission of >20%, and the molding composition affords a dark colour perception wherein the standard color value Y<30.

3. Thermoplastic molding compositions according to claim 1, which exhibits in the visible light region at a layer thickness which is at least within the range 0.4 to 5 mm low or nil transmission of <1% and in the wavelength region from 700 nm to 1200 nm, at least in spectral partial regions, transmission of >30% and affords a dark colour perception wherein the standard color value Y<30.

4. Thermoplastic molding compositions according to claim 1 comprising polyamides and/or polyesters and, optionally from 10 to 60% glass fibres.

5. Thermoplastic molding compositions according to claim 1, wherein the colorant combination is selected from the group consisting of at least one organic pigment or dye, wherein said organic pigment or dye is selected from the group consisting of pyrazolone, perinone, anthraquinone, methine, azo, and coumarin, and a metal-containing pigment.

6. Thermoplastic molding composition according to claim 5, wherein the metal-containing pigments are selected from the group consisting of inorganic pigments and metal complexes of azo, azomethine, methine dyes, quinacridone, dioxazine, isoindoline, isoindolinone, perylene, phthalocyanine, pyrrolopyrrole, thioindigo or bismuth vanadate.

7. Molded pans produced from thermoplastic molding compositions according to claim 1.

8. Process of using molding compositions in accordance with claim 1 comprising the production of molded parts which are bonded to other molded parts by laser transmission welding.

9. Bonded molded parts which are joined by laser transmission welding and at least one part of which consists of a thermoplastic molding composition according to claim 1.

* * * * *